United States Patent
Laing

(10) Patent No.: US 10,164,485 B2
(45) Date of Patent: Dec. 25, 2018

(54) STATOR-ROTOR DEVICE FOR AN ELECTRICAL MACHINE

(71) Applicant: XYLEM IP HOLDINGS LLC, White Plains, NY (US)

(72) Inventor: Karsten Laing, Althuette (DE)

(73) Assignee: XYLEM IP HOLDINGS LLC, Rye Brook, NY (US)

( * ) Notice: Subject to any disclaimer, the term of this patent is extended or adjusted under 35 U.S.C. 154(b) by 262 days.

(21) Appl. No.: 15/126,114

(22) PCT Filed: Mar. 6, 2015

(86) PCT No.: PCT/EP2015/054784
§ 371 (c)(1),
(2) Date: Sep. 14, 2016

(87) PCT Pub. No.: WO2015/135862
PCT Pub. Date: Sep. 17, 2015

(65) Prior Publication Data
US 2017/0093231 A1    Mar. 30, 2017

(30) Foreign Application Priority Data

Mar. 14, 2014   (DE) .................. 10 2014 103 568

(51) Int. Cl.
*H02K 1/27*     (2006.01)
*H02K 1/08*     (2006.01)
(Continued)

(52) U.S. Cl.
CPC .............. *H02K 1/08* (2013.01); *H02K 1/02* (2013.01); *H02K 1/27* (2013.01); *H02K 1/278* (2013.01);
(Continued)

(58) Field of Classification Search
CPC .... H02K 1/182; H02K 1/2793; H02K 21/026; H02K 21/185
See application file for complete search history.

(56) References Cited

U.S. PATENT DOCUMENTS 5,854,526 A    12/1998  Sakamoto

FOREIGN PATENT DOCUMENTS

| DE | 198 52 650 A1 | 5/2000 |
| EP | 1 612 912 A1 | 1/2006 |
| EP | 2 555 389 A1 | 2/2013 |

OTHER PUBLICATIONS

International Search Report with Written Opinion, dated Aug. 18, 2015, corresponding to International Patent Application No. PCT/EP2015/054784, filed Mar. 6, 2015.
(Continued)

*Primary Examiner* — Ramon M Barrera
(74) *Attorney, Agent, or Firm* — RatnerPrestia

(57) ABSTRACT

A stator-rotor device for an electrical machine, in particular an electric motor, includes a stator and a rotor, wherein the stator-rotor device pole cores provided with windings comprise pole shoes and magnets associated therewith. The pole shoes are connected via a first surface to a respective pole core and have a second surface that is facing towards the magnets. The pole shoes cooperate magnetically with the magnets and are separated from the latter by an air gap. The pole shoes and the magnets engage with one another in an engagement direction in such a way that in each case a section of the other component—magnet or pole shoes—is arranged lying opposite the respectively engaging component—pole shoe or magnet—transverse to the engagement direction on two sides facing away from one another. The second surface is larger than the first surface.

20 Claims, 12 Drawing Sheets

(51) Int. Cl.
*H02K 21/12* (2006.01)
*H02K 21/16* (2006.01)
*H02K 1/02* (2006.01)

(52) U.S. Cl.
CPC ........... *H02K 1/2793* (2013.01); *H02K 21/12* (2013.01); *H02K 21/16* (2013.01); *H02K 2201/03* (2013.01); *H02K 2201/12* (2013.01)

(56) References Cited

OTHER PUBLICATIONS

International Preliminary Report on Patentability and Written Opinion for International Application No. PCT/EP2015/054784, dated Sep. 14, 2016, 8 pages.

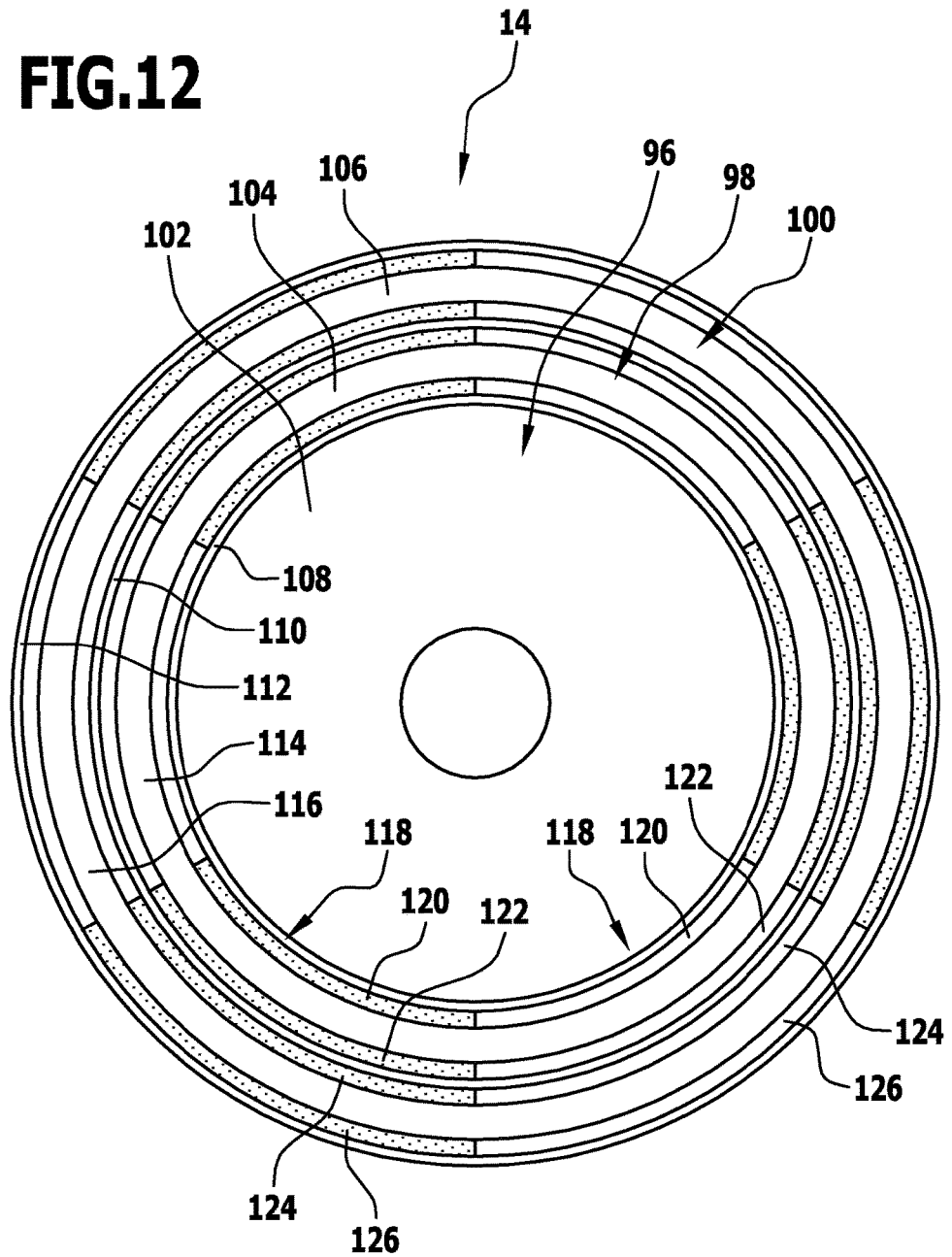

STATOR-ROTOR DEVICE FOR AN ELECTRICAL MACHINE

CROSS-REFERENCE TO RELATED APPLICATIONS

This patent application is a U.S. National Phase Patent Application of PCT Application No. PCT/EP2015/054784, filed Mar. 6, 2015, which claims priority to German Patent Application No. 102014103568.2, filed Mar. 14, 2014, each of which is incorporated by reference herein in its entirety.

FIELD OF THE INVENTION

The invention relates to a stator-rotor device for an electrical machine, in particular an electric motor, comprising a stator and a rotor, wherein the stator-rotor device comprises pole cores provided with windings, pole shoes and magnets associated therewith, wherein the pole shoes are connected via a first surface to a respective pole core and have a second surface facing towards the magnets, and wherein the pole shoes cooperate magnetically with the magnets and are separated from the latter by an air gap.

BACKGROUND OF THE INVENTION

Such a stator-rotor device (hereinafter also called "device" for the sake of simplicity) is used for example in an electric motor that is integrated in a motor pump unit. It is also conceivable however to use the device in generators.

When the device is used in an electric motor the device comprises windings surrounding the pole cores, through which a respective magnetic field is produced by current flowing through the pole cores. The magnetic field passes through the pole shoes and forms a magnetic dipole in the latter. The dipole can cooperate with the magnets, wherein the magnetic flux passes through the air gap between the pole shoes and the magnets.

It is possible for the stator to include the pole cores and the pole shoes and for the rotor to include the magnets. This situation may however may also be reversed, wherein the stator includes the magnets and the rotor includes the pole cores and the pole shoes.

The largest possible magnetic flux between the pole shoes and the magnets is desired. This requires the use of relatively expensive magnets. However, an inexpensive production of the device is also desirable.

SUMMARY OF THE INVENTION

The object of the present invention is to provide a generic stator-rotor device, in which preferably a compact construction can be achieved combined with an inexpensive production.

This object is achieved with a stator-rotor device of the type mentioned in the introduction, in that the pole shoes and the magnets engage with one another in an engagement direction so that in each case a section of the other component—magnet or pole shoe—is arranged opposite the respectively engaging component—pole shoe or magnet—transverse to the engagement direction on two sides facing away from one another, and that the second surface is larger than the first surface.

In the stator-rotor device according to the invention the pole shoes and the magnets engage with one another. For example, the pole shoes engage in the magnets. The magnets can also engage in the pole shoes. The engaging component, for example a pole shoe, has sides facing away from one another. The in each case other component, for example the magnet, comprises in each case a section opposite the sides of the first component, for example the pole shoe. The magnetic flux between the pole shoe and the magnets is thereby directed over the two sides of the engaging component and the sections of the respective other component. This enables a larger overlap between the fields of the pole shoes and the magnets to be achieved, wherein the magnetic flux can conveniently also be directed in the engagement direction. The second surface of the pole shoe on the side facing towards the magnet is larger than the first surface, by which the pole shoe is connected to the pole core and through which passes the magnetic flux that is generated by the flow of current through the windings or induces a voltage in the latter. The configuration of the stator-rotor device according to the invention allows in particular the use of inexpensive materials for producing and shaping the magnets, so that these can be manufactured easily and can be provided for an engagement by the pole shoes. For example, the magnets can be produced by an injection moulding method, which will also be discussed hereinafter. A high flux density through the first surface can be achieved even when using inexpensive magnets and with a relatively low magnet flux density in the air gap. The pole cores can thereby preferably be operated up to or close to the region of saturation magnetisation. At the same time a compact construction of the device can be achieved.

It may be envisaged in particular that one component, for example a magnet, forms a housing for the respective other component, for example the pole shoe. The housing is for example in the shape of a groove and is delimited in the engagement direction by a groove floor and transverse to the engagement direction by the aforementioned sections. The engaging component includes for example a strip-shaped or rib-shaped projection for the engagement in the housing.

The arrangement of two sections on the sides of the engaging component facing away from one another also enables a symmetrical magnetic flux to be achieved transverse to the engagement direction and to compensate forces transverse to the engagement direction. In this way a guidance and improved bearing of the rotor and a more uniform running can be ensured.

The movement direction of the magnets relative to the pole shoes when the rotor is turning is transverse to the engagement direction and transverse to the direction in which the sections of the engaging components face opposite one another.

It is advantageous if the respective engaging components—pole shoe or magnets—comprises engagement sections engaging in the respective other component—magnet or pole shoe, wherein in each case a section of the other components—magnet or pole shoe—is arranged opposite each engagement section transverse to the engagement direction on two sides facing away from one another. The engaging component, for example the pole shoe, can in particular comprise transverse to the engagement direction a plurality of projections forming the engagement sections. The projections can engage between respective sections of the magnets. In this way the second surface on the pole shoes can be formed substantially larger than the first surface and a large overlap of the magnetic fields of the pole shoes and the magnets can be achieved.

The in each case engaging component—pole shoe or magnet—is preferably equally spaced by the air gap from both sections of the respective other component—magnet or pole shoe.

In an advantageous embodiment of the stator-rotor device it is convenient if the pole shoes engage with one or more engagement sections in the magnets, wherein a section of a magnet is arranged opposite each engagement section transverse to the engagement direction on two sides facing away from one another. The pole shoes have for example an engagement section, opposite which lies in each case a section of the magnet on sides facing away from one another. The pole shoes can for example also have two engagement sections, opposite which respectively lie sections of the magnet.

It can be envisaged that sections of the magnets that are arranged on sides of an engagement section facing opposite one another are connected to one another. In particular the sections can be joined to one another as one piece. A magnet can include or form two sections that are joined to one another and between which is arranged an engagement section. The sections of the magnet are for example held on a joint carrier of the rotor or stator.

In a different advantageous embodiment of the stator-rotor device it is convenient if sections of the magnets, which are arranged on oppositely facing sides of an engagement section, are formed separated from one another. A magnet is accordingly understood here to mean in particular also an arrangement of magnets that have two sections separated from one another, between which is arranged an engagement section of the pole shoe.

For example the sections of the magnets are spaced axially or radially from one another, referred to a rotation axis of the rotor, wherein an engagement section engages in the gap between the sections of the magnet. The sections of the magnet can be held on at least one carrier of the rotor or stator.

It has proved advantageous in a practical implementation of the stator-rotor device if the sections of the magnet formed separately from one another are held on different carriers of the rotor or stator. A respective section of the magnet can be held on a first carrier and the section of the magnet formed separately from this can be held on a further carrier. Both carriers can be connected to one another in a torque-proof manner.

At least one carrier of the rotor or stator preferably forms a magnetic return body, which connects several magnets to one another.

As already mentioned, it may also be envisaged that the magnets engage with one or more engagement sections in the pole shoes, wherein a section of a pole shoe is arranged opposite each engagement section transverse to the engagement direction on two sides facing away from one another.

Preferably the ratio of the second surface to the first surface is equal or approximately equal to the ratio of the magnetic flux density through the air gap to the magnetic flux density through the pole core.

The ratio of the second surface to the first surface is at least approximately 3:1 and is preferably larger, for example at least approximately 5:1 or at least approximately 7:1.

It is convenient if the engaging component—pole shoe or magnet—engages free from indentations or undercuts in the respective other components—magnet or pole shoe. This for example facilitates the installation of the device. The pole shoe and the magnet can be moved relative to one another in the engagement direction, so that they inter-engage. A movement transverse to the engagement direction is not necessary. This also allows a compact construction and inexpensive production, since undercuts and indentations can be avoided.

It is conceivable that the pole shoes are formed integrally with the pole cores. The pole shoes can include the pole cores, and a respective winding can be installed on a respective pole shoe. The pole shoes can for example be connected to a magnetic return body, for example to a stator ring of the stator.

It can alternatively or additionally be envisaged that the pole cores are connected integrally to a magnetic return body, for example to a stator ring of the stator.

It has proved advantageous for example in the case of the last mentioned embodiment if the pole shoes are formed separately from the pole cores and are connected to the latter.

It is possible for the pole shoes to be formed of a material of lower magnetic permeability than the pole cores, or for the pole shoes to include a material of lower magnetic permeability than the pole cores.

The pole cores, for example together with a return body such as for example a stator ring, and/or the pole shoes are preferably made of a highly permeable material. Powdered metal particles, for example of soft iron, with an electrically insulating surface, for example a phosphate layer, can be used. The particles can be pressed into shape in a powder compression method and are then preferably heated in order to improve the strength. For example a Somaloy® material from the company Höganäs is used.

The magnets are preferably made of a material that contains magnetic particles embedded in a matrix. For example inexpensive ferrite magnetic particles are embedded in the matrix.

Preferably the matrix is a plastic matrix. In this way it is in particular possible to produce the magnets by an injection moulding method, in which the magnetic particles are already embedded into the matrix during the injection moulding. This is particularly advantageous in order to form magnets of even complex geometry. In particular this enables the magnets to be produced in a technically simple and inexpensive manner.

The pole shoes can be formed separately from one another and can be connected to a respective pole core, wherein in the circumferential direction of a rotation axis of the rotor adjacent pole shoes are separated from one another by air gaps. The pole shoes are for example arranged in the circumferential direction of the rotation axis. Adjacent pole shoes are separated from one another by an air gap. This proves to be advantageous for the production of the stator-rotor device, and undesired flux leakage can preferably be minimised. The pole shoes can be produced individually and connected individually to the pole cores. For example the pole shoes are connected radially or axially to the pole cores.

Advantageously magnets arranged in the circumferential direction of a rotation axis of the rotor adjoin one another gap-free. Adjacent magnets can contact one another in the circumferential direction of the rotation axis.

In an advantageous embodiment of the stator-rotor device it is expedient if the pole shoes and the magnets engage one another radially, referred to a rotation axis defined by the rotor. For example, the pole shoes engage in the magnets. Sections of the magnet can, as previously explained, then be spaced axially from one another. The pole shoes can be arranged radially on the outside and the magnets radially on the inside, or vice versa.

Alternatively or in addition it may be envisaged that the pole shoes and the magnets engage one another axially, referred to a rotation axis defined by the rotor. For example the pole shoes engage axially in the magnets. The sections of the magnet, as previously explained, can be spaced radially from one another.

In an advantageous embodiment of the stator-rotor device according to the invention the stator includes the pole cores and the pole shoes, and the rotor includes the magnets.

The stator comprises for example a stator ring, from which the pole cores project radially, wherein the pole shoes are fixed on the pole cores and engage radially in the magnets, wherein the magnets are held in a torque-proof manner on at least one carrier body of the rotor defining the rotation axis. The sections of a respective magnet, which lie opposite a respective engagement section of a pole shoe on its sides facing away from one another, are in particular axially spaced from one another.

The at least one carrier is preferably a disc or a ring or includes a disc or ring, which defines a plane transverse to the rotation axis and engages radially by positive engagement in grooves formed by the magnets. The magnets are held on the disc or ring by for example overmoulding or gluing and are thereby connected in a torque-proof manner to the latter.

In another advantageous embodiment of the stator-rotor device it is convenient if the stator has a stator ring, form which the pole cores project axially, wherein the pole shoes are fixed on the pole cores and engage axially in the magnets, the magnets being held in a torque-proof manner on at least one carrier of the rotor defining the rotation axis. The sections of a respective magnet that lie opposite a respective engagement section of a pole shoe on its sides facing away from one another are in particular spaced radially from one another.

The at least one carrier can in the last mentioned advantageous embodiment preferably include a disc or a ring, which defines a plane transverse to the rotation axis, as well as an edge aligned concentrically to the rotation axis, wherein magnets are fixed radially on the outside and/or radially on the inside to the edge. The edge is preferably firmly joined to the disc or to the ring, in particular in one piece.

For example two concentric carriers of different diameters are provided, wherein respectively a section of a magnet is fixed radially on the outside to the edge of the carrier of smaller diameter and radially on the inside to the edge of the carrier of larger diameter, and wherein the pole shoe engages between the sections. The sections are parts of a magnet in which a pole shoe engages. The sections can, as previously explained, be formed separately from one another or can be joined to one another. The two carriers can preferably be connected to one another in a torque-proof manner.

It may also be envisaged that three concentric carriers of different diameters are provided, wherein in each case a section of a magnet is fixed radially on the outside to the edge of the carrier of smallest diameter and radially on the inside to the edge of the carrier of largest diameter and wherein in each case a section of a magnet is fixed radially on the inside and on the outside on the edge of the carrier of intermediate diameter, and wherein a respective engagement section of the pole shoe engages between two sections lying opposite one another. In such an embodiment the magnet can in particular include four sections, which are radially spaced from one another. The sections can be formed separately or can be joined to one another. An engagement section of the pole shoe engages between the two radially inner sections and likewise an engagement section of the pole shoe engages between the two radially outer sections.

The carrier or carriers in the aforementioned advantageous embodiments serve in particular as magnetic return bodies and is/are preferably made of a soft magnetic material. The at least one carrier body can at the same time via the retention of the magnets perform a function as a magnetic return body.

In a further advantageous embodiment of the stator-rotor device the rotor includes the pole cores and the pole shoes, and the stator includes the magnets.

The rotor is in particular an inner rotor, which is surrounded by the stator.

The rotor can also be an outer rotor, which surrounds the stator.

BRIEF DESCRIPTION OF THE DRAWINGS

The following description of advantageous embodiments of the invention in conjunction with the drawings serves to illustrate the invention in more detail. In the drawings:

FIG. 12: shows a plan view of a rotor of the stator-rotor device, wherein the viewing direction is chosen along the line 12-12 in FIG. 10.

DETAILED DESCRIPTION OF THE INVENTION

Figure 1:
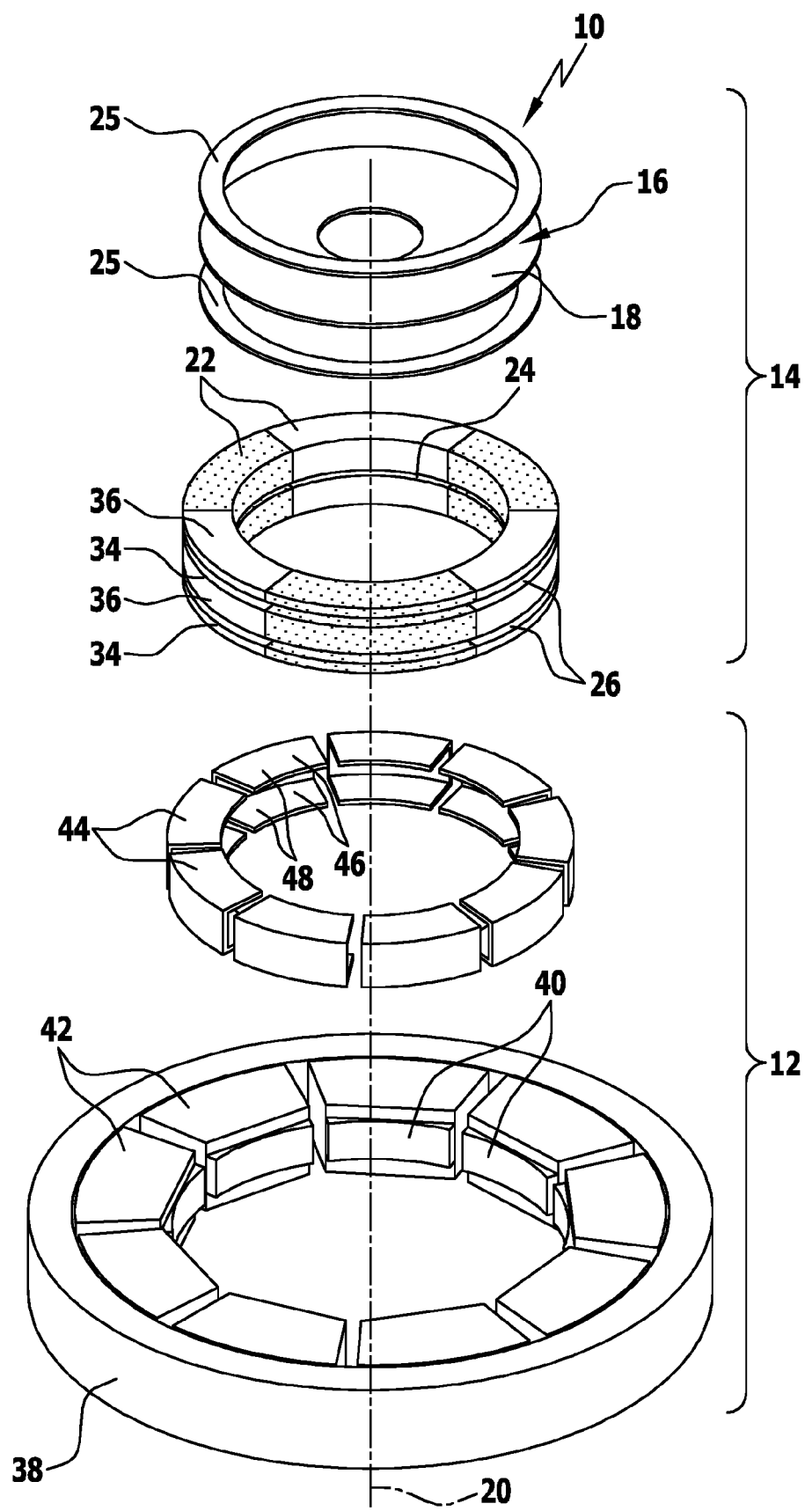
FIG. 1: shows a first advantageous embodiment of a stator-rotor device according to the invention in an exploded view.
Figure 2:
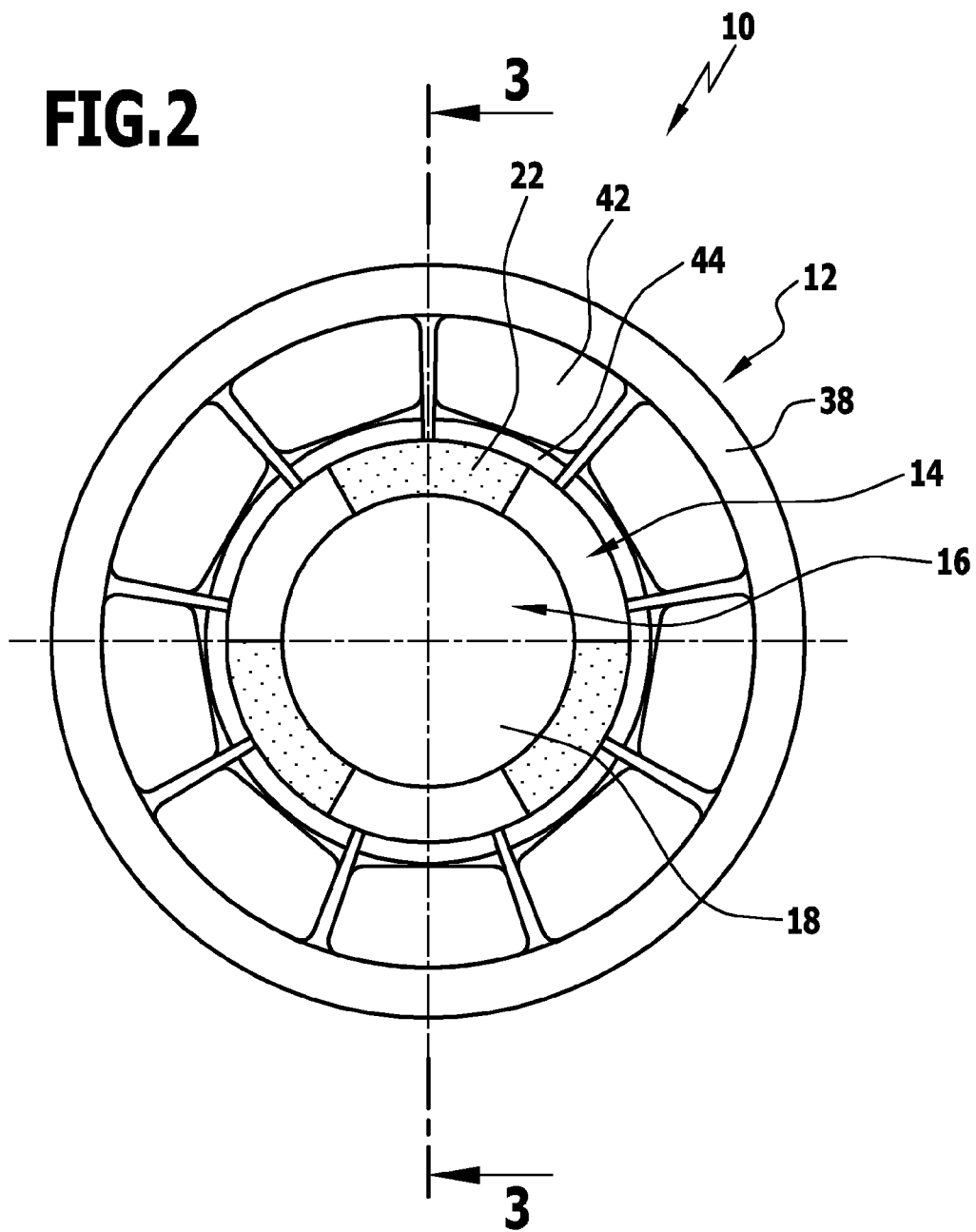
FIG. 2: shows a plan view of the stator-rotor device from FIG. 1.
Figure 3:
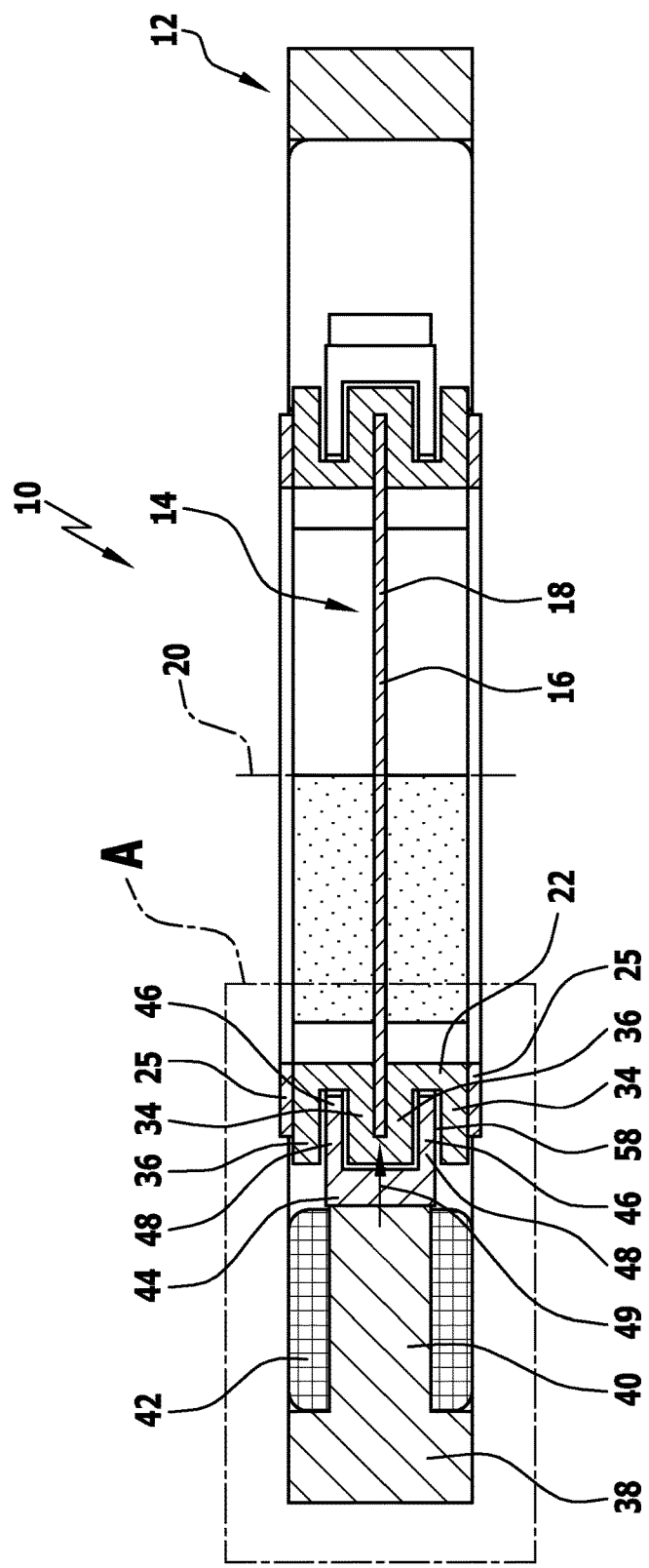
FIG. 3: shows a sectional view along the line 3-3 in FIG. 2.
Figure 4:
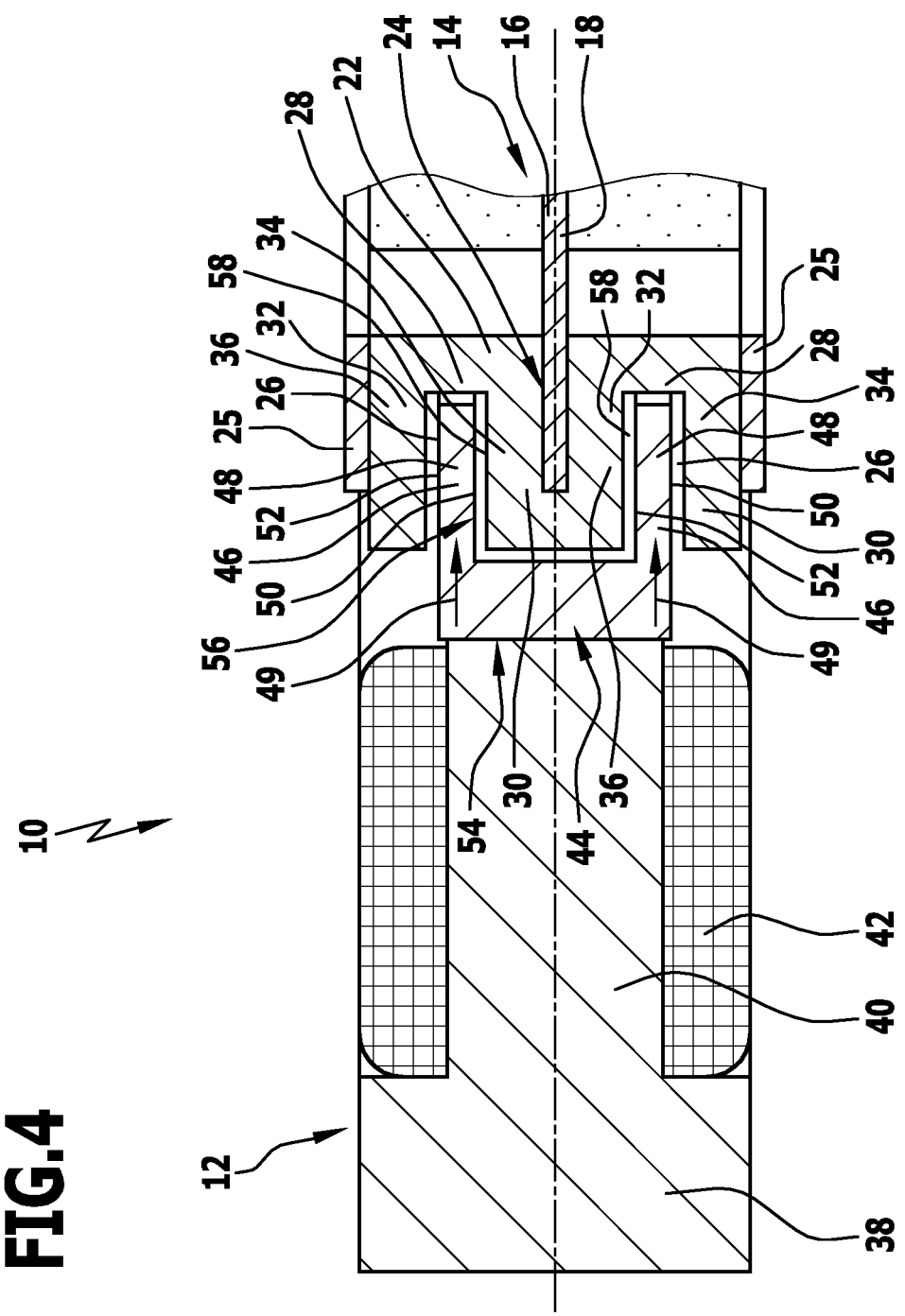
FIG. 4: shows an enlarged representation of detail A in FIG. 3.
Figure 5:
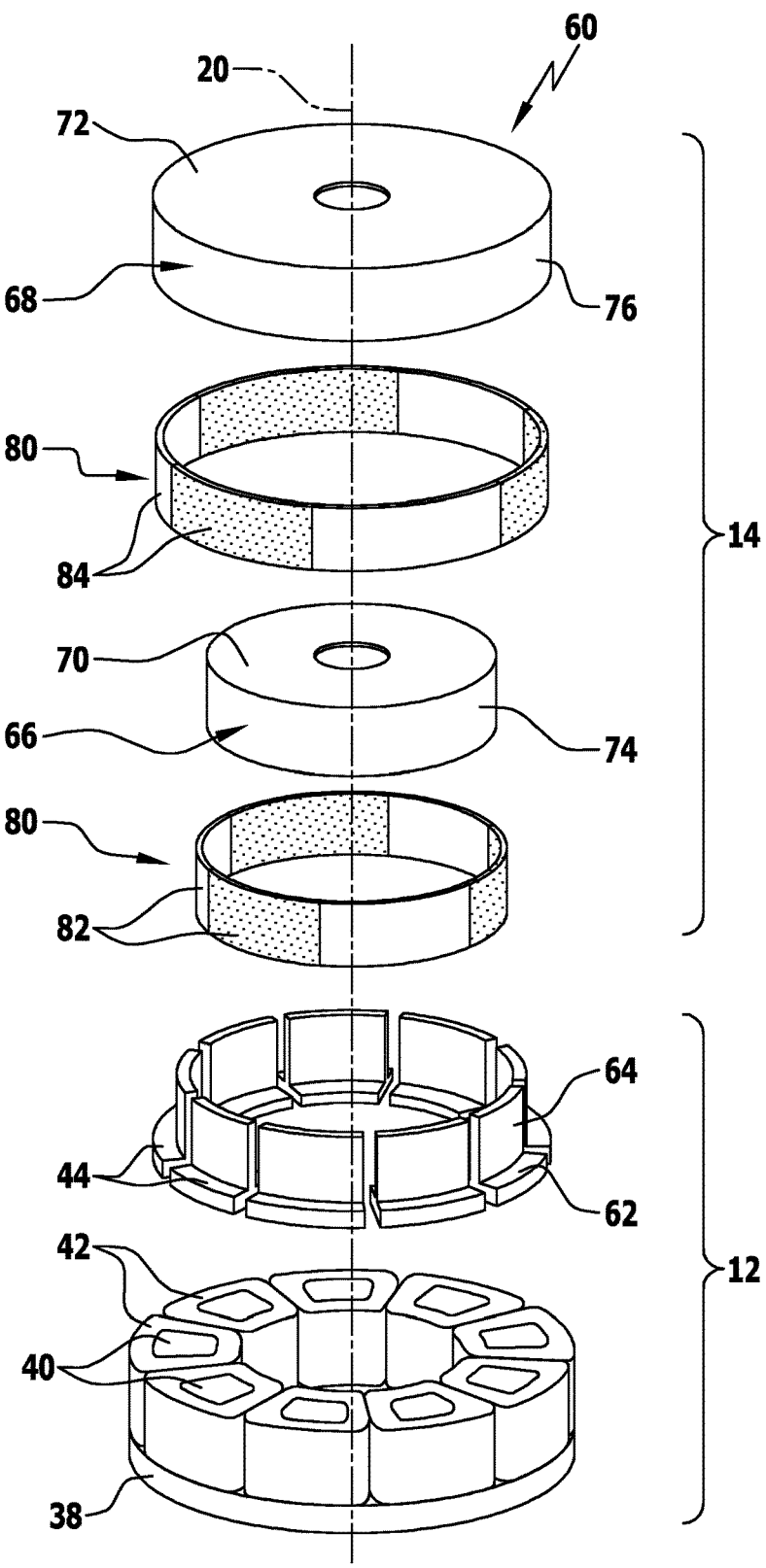
FIG. 5: shows a second preferred embodiment of a stator-rotor device according to the invention in an exploded view.
Figure 6:
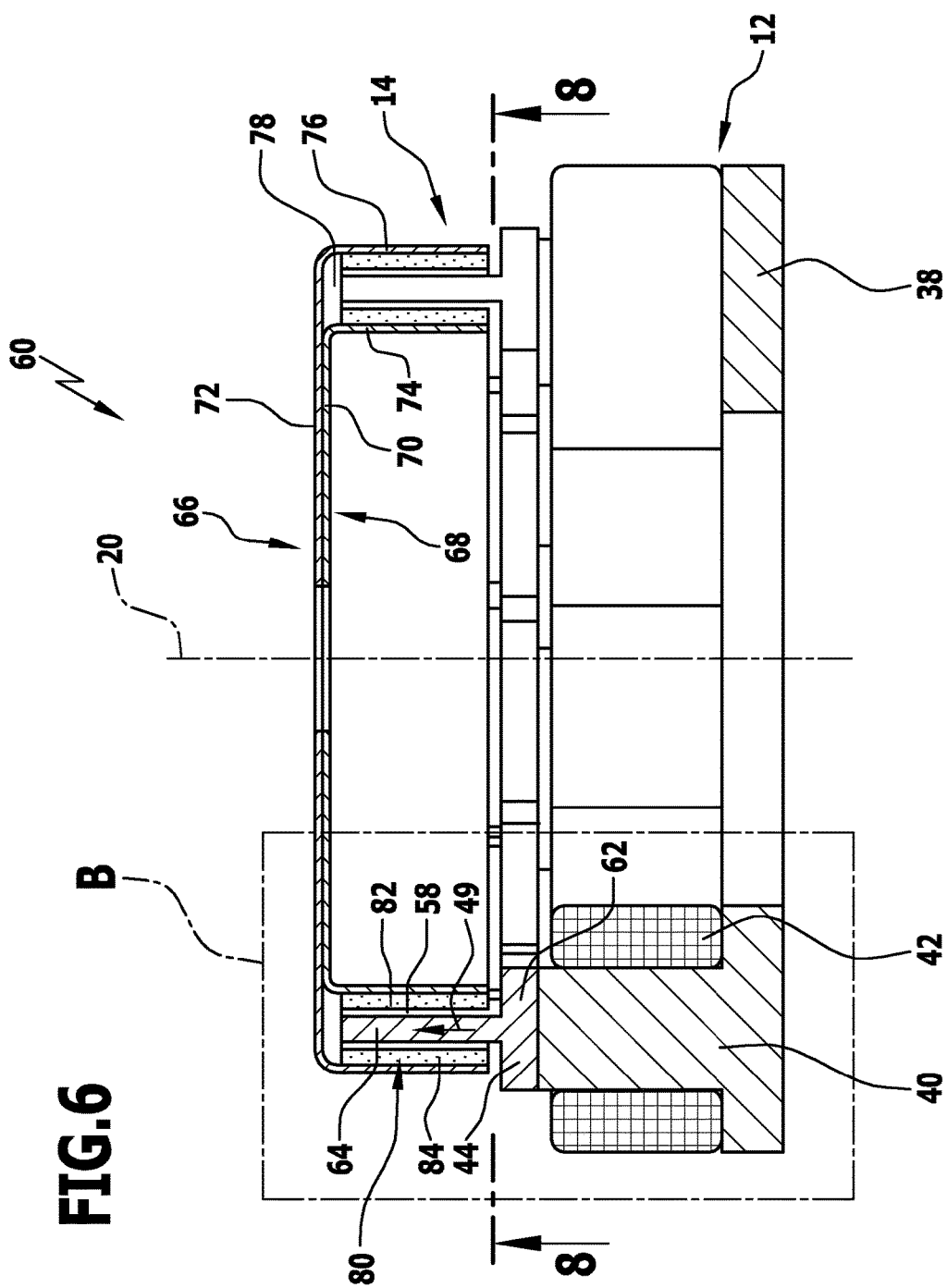
FIG. 6: shows a sectional view of the stator-rotor device from FIG. 5.
Figure 7:
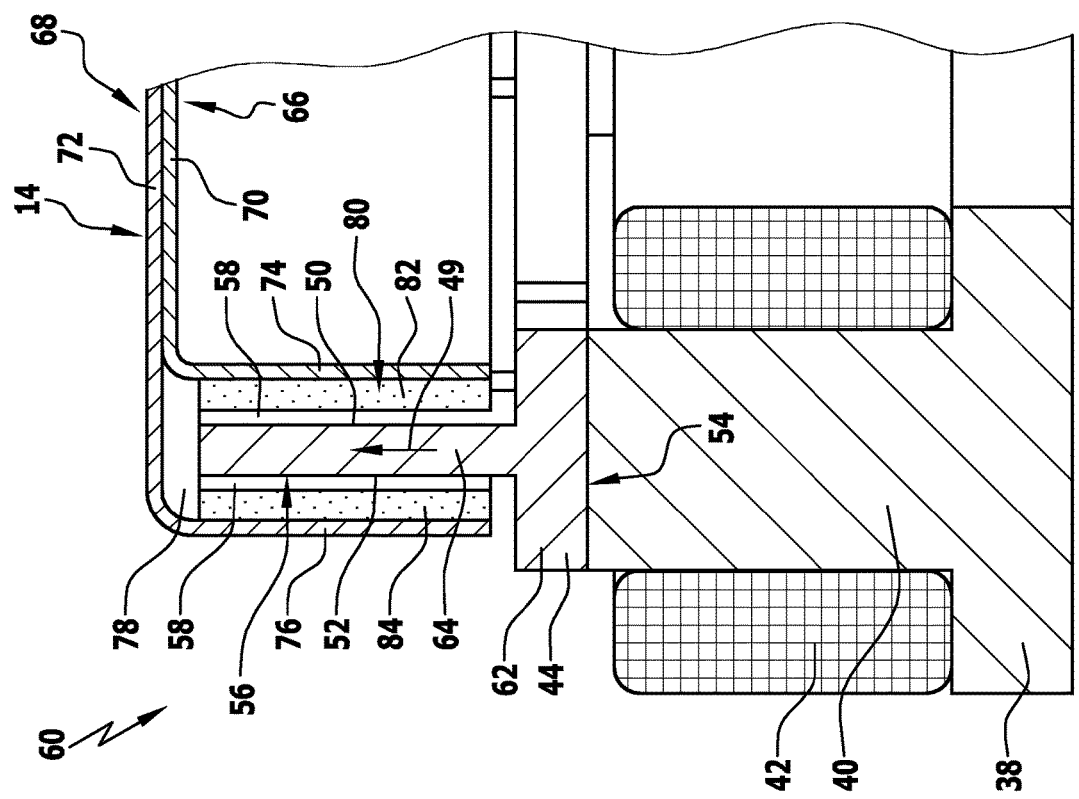
FIG. 7: shows an enlarged representation of detail B in FIG. 6.

FIGS. 1 to 4 show a first advantageous embodiment of a stator-rotor device according to the invention, identified by the reference numeral 10, hereinafter termed device 10. The device 10 can be used in particular in an electric motor.

The device 10 includes a stator 12 and a rotor 14. The rotor 14 includes a carrier 16, which is here configured as a disc 18. The disc 18 defines a plane and a rotation axis 20 of the rotor 14. "Radially" and "axially" should be understood here as referring to the rotation axis 20.

In addition the rotor 14 includes a plurality of magnets 22. Six magnets 22 for example are provided here. The magnets 22 here are preferably injection-moulded magnets. The injection-moulded magnets include magnetic particles, for example ferrite magnetic particles, embedded in a matrix, for example in a plastic material. The magnets can thereby be produced in an inexpensive and technically simple manner, and in particular can be shaped. Preferably the particles are distributed homogeneously in the matrix.

The magnets 22 are arranged radially on the outside of the disc 18 and are connected in a torque-proof manner to the latter. For this purpose the magnets 22 have in each case a recess in the shape of a groove 24. The disc 18 engages in a positive engagement manner in the groove 24, and the magnets are firmly connected to the disc 18, for example by gluing or overmoulding. In the circumferential direction of the rotation axis 20 adjacent magnets 22 adjoin one another.

The magnets 22 are of identical shape, adjacent magnets being magnetised oppositely to one another. For example, the magnets 22 identified by dots in the drawing have a magnetic north pole axially on the upper side and lower side on the surfaces facing towards the magnetic return bodies 25 mentioned hereinafter and on the surface facing towards the disc 18. The magnets 22 facing towards the engagement sections 48 in the grooves 26 in the grooves mentioned hereinafter can have magnetic south poles. The polarity of the magnets 22 that are not identified by dots is reversed.

The disc 18 serves to hold the magnets 22 and in addition serves as a magnetic return body, and is for this purpose made of a soft magnetic material. For the magnetic return furthermore two return bodies of a soft magnetic material are present, which are shaped for example as rings 25 (not shown in FIG. 2). The rings 25 are for example fixed on respective axial end surfaces of the magnets 22.

Two recesses in the shape of radial grooves 26 are arranged radially on the outside on each magnet 22. The grooves run in the circumferential direction of the rotation axis 20. Each groove 26 has a groove floor 28 and walls 30, 32. The walls 30, 32 of each groove 26 are spaced axially from one another and therefore transverse to the radial direction.

The walls 30, 32 form sections 34, 36 of the magnet 22. In the present case all sections 34, 36 are joined to one another. The magnet 22 therefore has a double U-shape or W-shape in cross-section. The magnet 22 is, as illustrated in the drawing, formed for example in one piece. The sections 34 and 36 could however also be separated from one another, as in the case of the magnets 80 and 118 of the devices 60 and 90 described hereinafter.

One groove 26 with each of the corresponding walls 30, 32 is arranged above and below the plane of the disc 18.

The rotor 14 is in the present case an inner rotor, which surrounds the stator 12 on the outside. The stator 12 includes a stator ring 38. Several pole cores 40 project radially inwardly from the stator ring 38. In the present nine pole cores 40 are provided for example.

A winding 42 is associated with each pole core 40, which surrounds the respective pole core 40. The pole cores 40 can be magnetised by passing current through the windings 42.

Preferably the stator ring 38 is formed as one piece with the pole cores 40 from a powdered metallic material pressed into shape, wherein the individual particles are coated with an electrically insulating layer. For example a Somaloy® material from the company Höganäs is used. This enables strong magnetic fields to be generated in the pole cores 40. In addition the geometry of the stator 12 can be adapted very well to the pattern of the magnetic flux.

The stator 12 also includes pole shoes 44, which are manufactured in the same way by means of a powder compression method as the stator ring 38 together with the pole cores 40. The pole shoes 44 are formed identically. A pole shoe 44 is associated with each pole core 40, so that in the present case nine pole shoes 44 are present.

The pole shoes 44 are arranged radially on the inside with respect to the pole cores 40, wherein each pole shoe 44 is connected to the pole core 40 associated with it. The pole shoe 44 is formed separately from the pole core 40 and is connected to the latter.

In another embodiment the pole shoes could also include the pole cores and could be connected to the stator ring. A one-part connection of the pole cores, pole shoes and stator ring is also conceivable.

In the circumferential direction of the rotation axis 20 adjacent pole shoes 44 are separated from one another by an air gap, so that they do not border one another. This facilitates the installation of the pole shoes 44 and reduces undesired flux leakage.

The pole shoes 44 have a U-shaped configuration in cross-section. They include two strip-shaped projections 46 spaced axially apart from one another. Each projection 46 is directed radially inwardly and extends in the circumferential direction of the rotation axis 20. The projections 46 form in each case an engagement section 48 for the engagement in the grooves 26. Each engagement section 48 engages in an engagement direction 49 in a groove. The engagement direction 49 is in the present case aligned radially.

Each engagement section 48 has a first side 50, which faces towards a respective section 34 of the magnet 22. The section 34 accordingly lies opposite the first side 50. In addition each engagement section 48 has a second side 52. The second side 52 faces away from the first side 50. The second side 50 lies opposite a respective section 36 of the magnet 22. The sections 34, 36 of the same magnetic polarity face towards the respective engagement section 48.

As a result in each case a section 34, 36 of the magnet 22 is arranged transverse to the engagement direction 49 on sides 50, 52 of each engagement section 48 lying (axially) opposite one another, when the pole shoe 44 engages in the magnet 22. An air gap 58 is formed between the pole shoe 44 and the magnet 22, through which passes a magnetic flux when the pole shoe 44 and the magnet 22 cooperate.

The pole shoes 44 have a first surface 54 facing towards the respective pole core 40. In addition the pole shoes 44 have respectively a second surface 56, which faces towards the respective magnet 22. Due to the engagement of the pole shoes 44 in the magnets 22 it is possible to form the second surface 56 substantially larger than the first surface 54. This has the advantage that a large overlap between the magnetic fields of the pole shoes 44 and of the magnets 22 can be achieved. In this connection a narrow shape of the air gap 58 is advantageous.

Although the inexpensive magnets 22 are used in the device 10, which provide a relatively small magnetic flux density through the air gap 58, a large magnetic flux density can be generated at the surface 54. The pole cores 40 can in this way be operated up to or almost up to the range of saturation magnetisation. At the same time a compact construction of the device 10 is achieved.

The magnetic flux through the air gap 58 passes not only axially through the sides 50, 52. The second surface 56 also includes the radial sleeve surfaces, likewise permeated by magnetic flux, of the pole shoes 44 on the engagement sections 48 and between the latter. Compared to a conventional cylinder engine, which simply has radial sleeve surfaces, the engagement of the pole shoes 44 in the grooves 26 enables the surface 56 to be enlarged on the sides 50, 52 in the axial direction, combined with a more compact construction.

It has proved advantageous in this connection that the magnets 22 can be manufactured very precisely fitting by the injection moulding method and the pole shoes 44 very precisely fitting by the powder compression method, despite the fact that these are inexpensive production methods. Due to a narrow air gap 58 there is also a better concentration of the magnetic flux between the pole shoes 44 and the magnets 22. Flux leakages can thereby preferably be minimised. As a result, despite the low magnetic flux density in the air gap 58 a large flux density is obtained through the surface 54 and in the pole core 40.

Two further advantageous embodiments of the stator-rotor device according to the invention are now described hereinafter with reference to FIGS. 5 to 8 and 9 to 12, whose essential differences compared to the device 10 are explained. Mainly the same reference numerals are used for identical or equivalent features and components of the three advantageous embodiments presented here. The advantages explained in connection with the device 10 can also be achieved with the embodiments described hereinafter.

FIGS. 5 to 8 show a stator-rotor device 60. The stator 12 includes the stator ring 38. A plurality of pole cores 40 project axially from the stator ring 38. In the present case nine pole cores 40 are also provided. In each case a winding 42 is associated with the pole cores 40. The stator ring 38 is fabricated in one piece with the pole cores 40 by means of the aforementioned powder compression method, as are the pole shoes 44.

The stator 12 also includes a plurality of pole shoes 44. A pole shoe 44 is associated with each pole core 40, so that accordingly nine pole shoes 44 are present. The pole shoes 44 are formed, as in the case of the device 10, separately from the pole cores 40 and are connected to these on the respective first surface 54. In the circumferential direction of the rotation axis 20 adjacent pole shoes 44 are separated from one another by an air gap.

Each pole shoe 44 includes a plinth section 62, which faces towards the pole core 40. An engagement section 64 projects axially from the plinth section 62. The engagement section 64 is configured as an axially extending strip, which has a curvature in the circumferential direction of the rotation axis 20.

The rotor 14 includes two carriers 66, 68. The diameter of the carrier 66 is smaller than the diameter of the carrier 68. Each carrier 66, 68 comprises a disc 70, 72 as well as an edge 74, 76. The planes defined by the discs 70, 72 are aligned perpendicular to the rotation axis 20. The discs 70, 72 are connected in a torque-proof manner to one another and, like the edges 74, 76, are aligned concentrically to one another.

The edge 74 is arranged radially on the outside on the disc 70 and extends away from this in the axial direction. In a corresponding way the edge 76 is arranged radially on the outside on the disc 72 and extends in the axial direction away from this. The edges 74, 76 are oriented axially in the same direction. An annular gap 78 is thus arranged between the edges 74, 76, via which the edges 74, 76 are spaced from one another.

The rotor 14 includes a plurality of magnets 80, and in the present case six magnets 80 are provided. Preferably the magnets 80 are produced like the magnets 22 in an inexpensive and technically simple manner by an injection moulding method. The magnets are of identical shape, wherein in the circumferential direction of the rotation axis 20 adjacent magnets 18 are oppositely magnetised. Adjacent magnets border one another in the circumferential direction.

Figure 8:
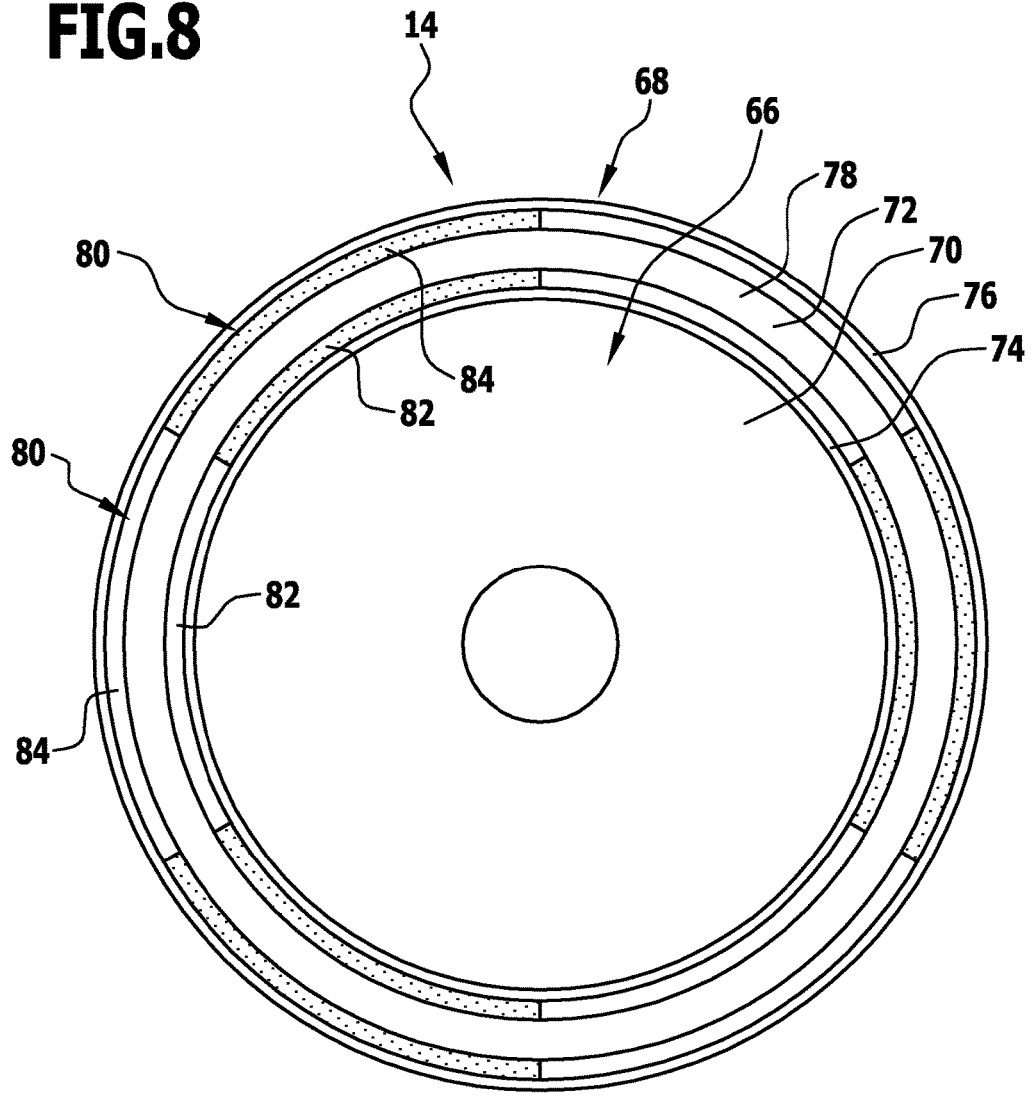
FIG. 8: shows a plan view of a rotor of the stator-rotor device, wherein the viewing direction is chosen along the line 8-8 in FIG. 6.
Figure 9:
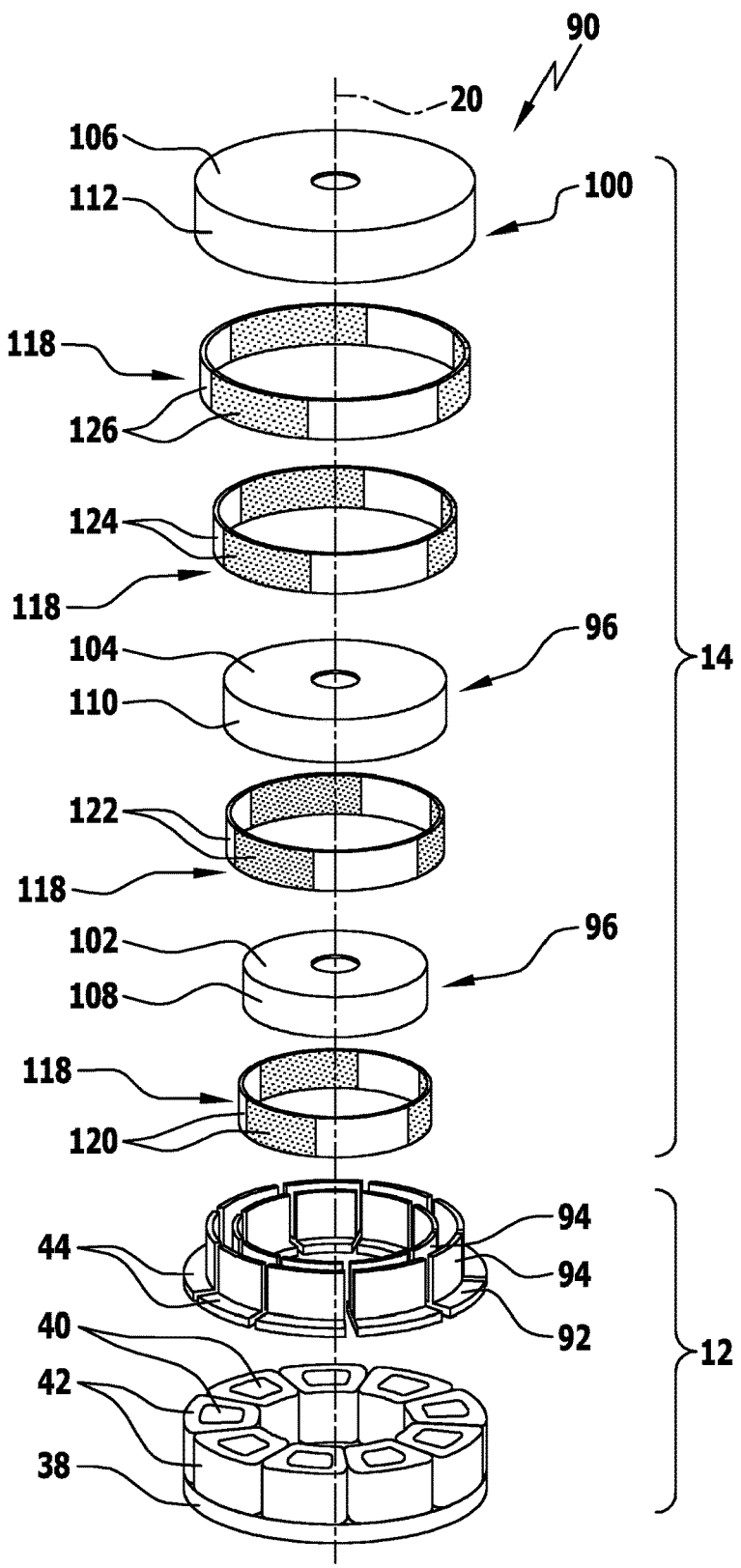
FIG. 9: shows a third preferred embodiment of a stator-rotor device according to the invention in an exploded view.
Figure 10:
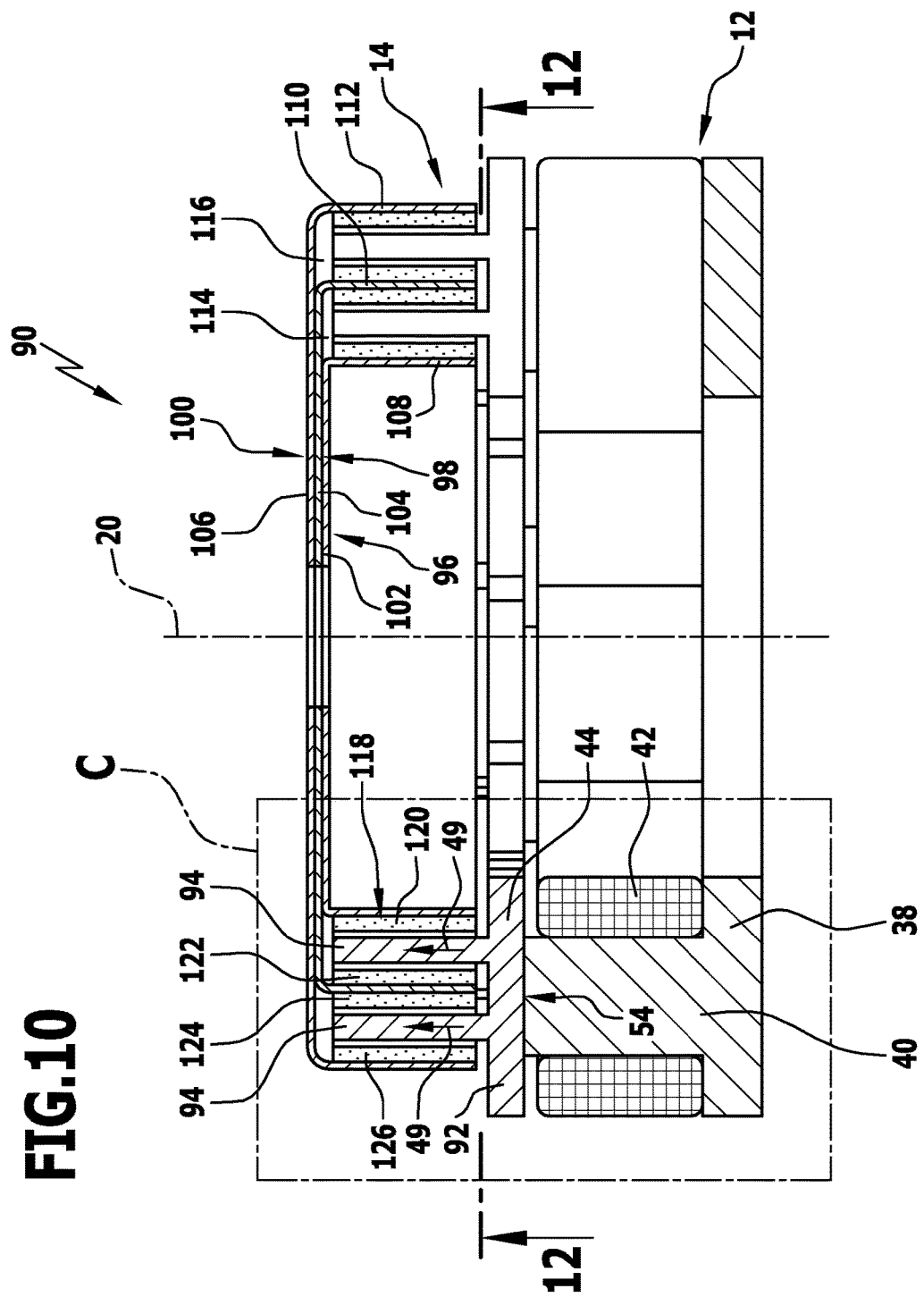
FIG. 10: shows a sectional view of the stator-rotor device from FIG. 9.
Figure 11:
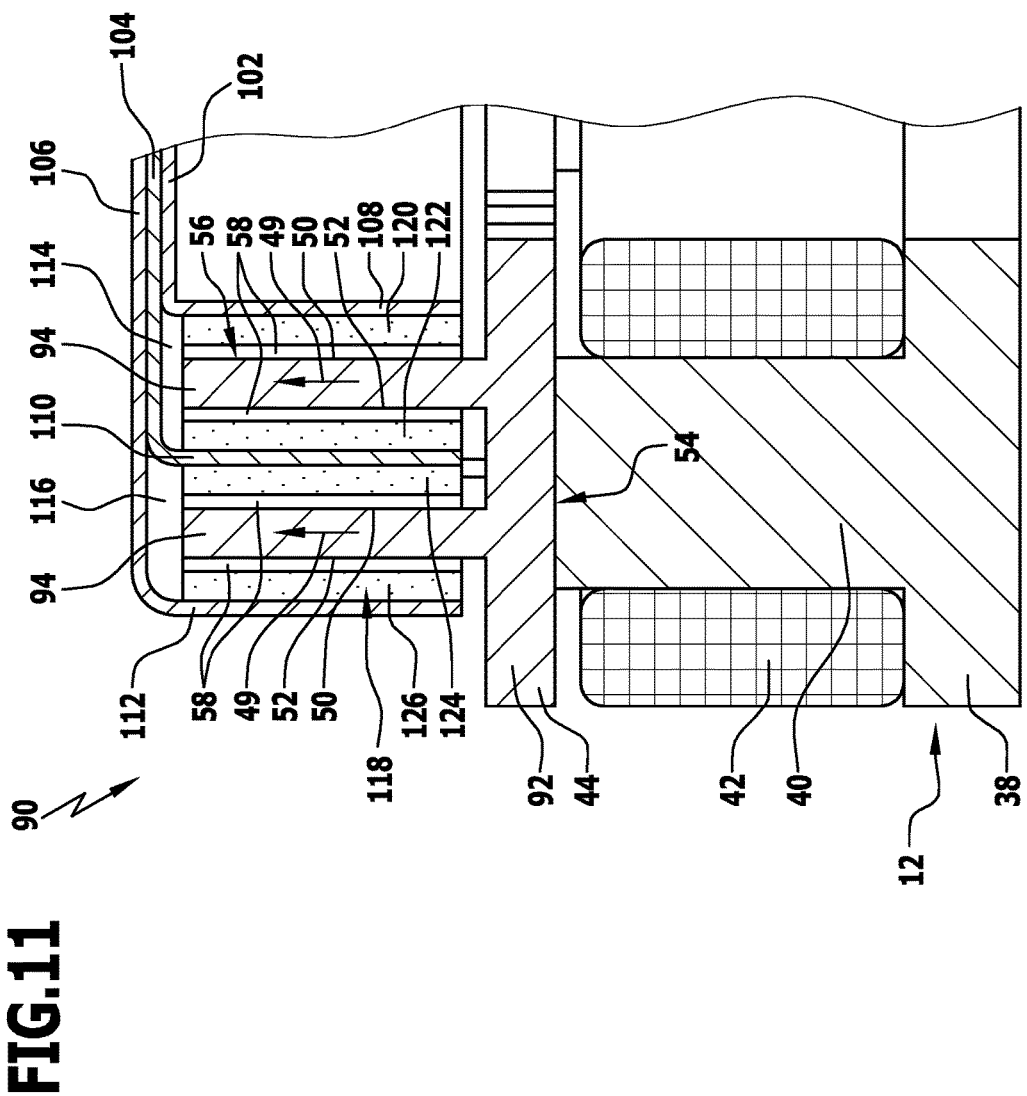
FIG. 11: shows an enlarged representation of detail C in FIG. 10.

Each magnet 80 includes a section 82 that is fixed in a torque-proof manner radially on the outside on the edge 74. The respective magnet 80 in addition includes a section 84, which is fixed in a torque-proof manner radially inside on the edge 76. Accordingly each magnet 80 comprises two sections 82, 84 spaced radially apart from one another and not connected to one another (FIG. 8). Overall therefore six sections 82 and six sections 84 associated with the latter are provided.

The sections 82, 84 facing towards the annular space 78 have an identical polarity, for example a magnetic south pole in the case of the magnets 80 characterised by the dots. The magnets 80 facing towards the edges 74, 76 then for example have a north pole. The polarity is reversed in the neighbouring magnets 80.

The sections 82, 84 could in the device 60 be connected to one another instead of being arranged separately from one another. For example the magnets 80 could have a U-shaped profile.

The carriers 66, 68 form magnetic return bodies and are preferably made of a soft magnetic material.

The engagement section 64 of a pole shoe 44 engages axially in a magnet 80. The engagement direction 49 is in the case of the device 60 therefore aligned axially. The sections 82, 84 are arranged transverse to the engagement direction, in the radial direction, on sides of the engagement section 64 lying opposite one another. The sides 50, 52 are arranged facing away from one another on the engagement section 64. The section 82 faces towards the first side 50 and the section 84 towards the second side 52.

The air gap 58 between the pole shoe 44 and the magnet 80 can be kept narrow on both sides of the engagement section 64. The second surface 56 is also in the device 60 substantially larger than the first surface 54. Even when using inexpensive magnets produced by an injection moulding method and with the correspondingly rather low magnetic flux density in the air gap 58, a large magnetic flux density can be produced on the surface 54. Also with the device 60 the pole cores 40 can be operated up to or almost up to the region of saturation magnetisation. In addition a compact construction of the device 60 is achieved.

Furthermore the pole shoes 44 can be produced inexpensively and thus the device 60 can be manufactured inexpensively.

FIGS. 9 to 12 show a stator-rotor device according to the invention identified by the reference numeral 90.

The stator ring 38 and the pole cores 40 in the device 90 are configured identically to the device 60, so that reference may be made in this regard to the previous explanations.

The pole shoes 44 project axially from the pole cores 40 as in the device 60 and are formed separately from the pole cores 40. The pole shoes 44 are produced by the already mentioned powder compression method. The pole shoes 44 have a plinth section 92 and in addition two engagement sections 94 projecting axially from the latter. The engagement sections 94 are spaced radially from one another and are configured as axially extending strips. In the circumferential direction of the rotation axis 20 the engagement sections 94 are curved like the engagement section 64.

In the present case a total of nine pole shoes 44 are present, which in the circumferential direction of the rotation axis 20 are separated from one another by a respective air gap.

The rotor 14 in the device 90 includes three concentric carriers 96, 98 and 100. The carriers 96, 98, 100 comprise a respective disc 102, 104 and 106, which are connected radially on the outside to a respective edge 108, 110 and 112. The construction of the carriers 96, 98, 100 corresponds to that of the carriers 66, 68 in the device 60. The carriers 96, 98 and 100 form magnetic return bodies like the carriers 66, 68 in the device 60 and are preferably produced from a soft magnetic material.

The diameter of the carrier 96 is smallest and that of the carrier 100 is largest. The carrier 98 is the carrier with the intermediate diameter.

All edges 108, 110, 112 project axially from the respective disc 102, 104 and 106 and are aligned in the same direction. An annular space 114 is formed between the edges 108, 110 and an annular space 116 is formed between the edges 110 and 112.

The rotor includes a plurality of magnets 118. In the present case six magnets 118 are provided, which have respectively four sections 120, 122, 124 and 126 radially spaced apart and separated from one another. The magnets 118 are of identical shape, wherein in the circumferential direction of the rotation axis 20 adjacent magnets 118 are oppositely magnetised. The magnets 118 are preferably produced like the magnets 22 in an inexpensive and technically simple manner by an injection moulding method.

The sections 120 are fixed in a torque-proof manner radially on the outside on the edge 108. The sections 120, 122 are fixed in a torque-proof manner radially on the inside and radially on the outside on the edge 110, and the sections 124 are fixed in a torque-proof manner radially on the inside on the edge 112. Accordingly, also in the device 90 a respective magnet 118 is composed of several sections 120 to 124.

Facing towards the annular spaces 114 and 116 the sections 120 and 122 and the sections 124 and 126 have the same magnetic polarity, for example a magnetic south pole. Facing towards the edges 108, 110 and 112, the section 120, the sections 122 and 124 and the section 126 then have a magnetic north pole. The magnetic polarity of the adjacent magnets 118 is exactly reversed.

The engagement sections 94 engage axially in the magnets 118. The engagement direction 49 is therefore axially aligned in the device 90.

In particular the radially inside engagement section 94 engages between the sections 120, 122. The section 120 faces towards the first side 50 and the section 122 towards the second side 52 of the radially inside engagement section 94. The sections 120, 122 are arranged in the radial direction transverse to the engagement direction 49 on oppositely facing sides of the engagement section 94.

In a corresponding way the section 124 faces towards the first side 50 of the engagement section 94 arranged radially on the outside, and the second section 126 faces towards the second side 52 of the engagement section 94 arranged radially on the outside. The sections 124, 126 are arranged in the radial direction transverse to the engagement direction 49 on oppositely facing sides of the engagement section 94.

The engagement of the pole shoes 44 in the magnets 118 in the device 90 resembles the engagement of the pole shoes 44 in the magnets 22 in the device 10. The differences consist on the one hand in the radial engagement in the device 10 and in the axial engagement in the device 90. In the device 90 the sections 120 to 126 are formed separated from one another, whereas the magnet 22 in the device 10 is formed in one piece. Furthermore the sections 120 and 122 as well as 124 and 126 are not connected to one another, the corresponding connection in the sections 34, 36 taking place via the groove floor 28.

In the device 90 it could however also be envisaged to connect the sections 122 and 124 to one another or to connect all sections 120 to 126 to one another. In particular also the magnet 118 can be formed in one piece.

Also in the device 90 the air gap 58 between the pole shoes 44 and the magnets 118 is preferably kept small.

The second surface 56 is substantially larger than the first surface 54. Even when using inexpensive magnets 118 produced by an injection moulding method and with the therefore rather small magnetic flux density in the air gap 58, a high magnetic flux density can be provided on the surface 54. Also, in the device 90 the pole cores 40 can be operated up to or almost up to the region of saturation magnetisation. In addition a compact construction of the device 90 is achieved.

In addition the device 90 can be produced inexpensively by an inexpensive production of the pole shoes 44.

LIST OF REFERENCE NUMERALS

10 Stator-rotor device
12 Stator
14 Rotor
16 Carrier
18 Disc
20 Rotation axis
22 Magnet
24 Groove
25 Ring
26 Groove
28 Groove floor
30 Wall
32 Wall
34 Section
36 Section
38 Stator ring
40 Pole core
42 Winding
44 Pole shoe
46 Projection
48 Engagement section
49 Engagement section
50 First side
52 Second side
54 First surface
56 Second surface
58 Air gap
60 Stator-rotor device
62 Plinth section
64 Engagement section
66 Carrier
68 Carrier
70 Disc
72 Disc
74 Edge
76 Edge
78 Annular space
80 Magnet
82 Section
84 Section
90 Stator-rotor device
92 Plinth section
94 Engagement section
96 Carrier
98 Carrier
100 Carrier
102 Disc
104 Disc
106 Disc
108 Edge
110 Edge 112 Edge
114 Annular space
116 Annular space
118 Magnet
120 Section
122 Section
124 Section
126 Section

The invention claimed is:

1. A stator-rotor device for an electrical machine including a stator and a rotor, said stator-rotor device comprising:
pole cores having windings,
pole shoes and magnets associated with the pole cores, each pole shoe having a first surface connected to a respective pole core and a second surface that faces towards the magnets, and
wherein the pole shoes cooperate magnetically with the magnets and are separated from the magnets by an air gap,
wherein the pole shoes and the magnets engage with one another in an engagement direction in such a way that, in each case, a section of one of the magnet and pole shoe lies opposite a section of the other of the magnet and pole shoe and transverse to the engagement direction on two sides facing away from one another,
wherein the second surface is larger than the first surface,
wherein the stator comprises a stator ring, from which the pole cores project axially, wherein the pole shoes are fixed to the pole cores and engage axially in the magnets, wherein the magnets are held in a torque-proof manner on at least one carrier of the rotor defining a rotation axis,
wherein the at least one carrier includes a disc or a ring, which defines a plane transverse to the rotation axis, as well as an edge aligned concentrically to the rotation axis, wherein magnets are fixed radially on an outside or radially on an inside of the edge.

2. The stator-rotor device according to claim 1, wherein said other of the magnet and pole shoe comprises several engagement sections engaging in said one of the magnet and pole shoe, wherein, in each case, a section of said one of the magnet and pole shoe is opposite each engagement section and transverse to the engagement direction on two sides facing away from one another.

3. The stator-rotor device according to claim 2, wherein said other of the magnet and pole shoe is equally spaced via the air gap from both sections of said one of the magnet and pole shoe.

4. The stator-rotor device according to claim 2, wherein the pole shoes engage with one or more engagement sections in the magnets, wherein a section of one of the magnets is opposite each engagement section and transverse to the engagement direction on two sides facing away from one another.

5. The stator-rotor device according to claim 4, wherein sections of the magnets that are arranged on sides of an engagement section lying opposite one another are formed separated from one another.

6. The stator-rotor device according to claim 5, wherein the sections of the magnets formed separated from one another are held on different carriers of the rotor or stator.

7. The stator-rotor device according to claim 1, wherein a ratio of the second surface to the first surface is at least approximately 3:1.

8. The stator-rotor device according to claim 1, wherein said other of the magnet and pole shoe engages free from undercuts in the said one of the magnet and pole shoe.

9. The stator-rotor device according to claim 1, wherein the pole shoes are formed separated from the pole cores and are connected to the pole cores.

10. The stator-rotor device according to claim 1, wherein the pole shoes are composed of a material of lower magnetic permeability than the pole cores or include a material of lower magnetic permeability than the pole cores.

11. The stator-rotor device according to claim 1, wherein the magnets are composed of a material that includes magnetic particles embedded into a matrix.

12. The stator-rotor device according to claim 11, wherein the matrix is a plastic matrix.

13. The stator-rotor device according to claim 1, wherein the pole shoes are separated from one another and are connected to a respective pole core, wherein in a circumferential direction of a rotation axis of the rotor, adjacent pole shoes are separated from one another by air gaps.

14. The stator-rotor device according to claim 1, wherein the magnets arranged in a circumferential direction of a rotation axis of the rotor border one another free from gaps.

15. The stator-rotor device according to claim 1, wherein the pole shoes and the magnets engage radially in one another, with respect to a rotation axis defined by the rotor.

16. The stator-rotor device according to claim 1, wherein the pole shoes and the magnets engage axially in one another, with respect to a rotation axis defined by the rotor.

17. The stator-rotor device according to claim 1, wherein the stator includes the pole cores and the pole shoes and the rotor includes the magnets.

18. The stator-rotor device according to claim 1 further comprising two concentric carriers of different diameters, wherein respectively a section of one of the magnets is fixed radially on the outside of the edge of the carrier of smaller diameter and radially on the inside of the edge of the carrier of larger diameter, and wherein the pole shoe engages between the sections.

19. The stator-rotor device according to claim 1 further comprising three concentric carriers of different diameters, wherein respectively a section of one of the magnets is fixed radially on the outside of the edge of the carrier of smallest diameter and radially on the inside of the edge of the carrier of largest diameter, and wherein respectively a section of one of the magnets is fixed radially on the inside and on the outside of the edge of the carrier of intermediate diameter, and wherein a respective engagement section of the pole shoe engages between two sections lying opposite one another.

20. The stator-rotor device according to claim 1, wherein the rotor includes the pole cores and the pole shoes and the stator includes the magnets.

* * * * *